(12) United States Patent
Sakai et al.

(10) Patent No.: US 7,197,939 B2
(45) Date of Patent: Apr. 3, 2007

(54) PRESSURE SENSOR

(75) Inventors: Minekazu Sakai, Kariya (JP); Yasutoshi Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 11/046,792

(22) Filed: Feb. 1, 2005

(65) Prior Publication Data

US 2005/0172724 A1    Aug. 11, 2005

(30) Foreign Application Priority Data

Feb. 9, 2004    (JP) ............................. 2004-031687

(51) Int. Cl.
*G01L 21/12* (2006.01)
*G01L 9/00* (2006.01)

(52) U.S. Cl. ........................................ 73/754
(58) Field of Classification Search .................. 73/754
See application file for complete search history.

(56) References Cited

U.S. PATENT DOCUMENTS

| 4,085,620 A * | 4/1978 | Tanaka ......................... 73/727 |
| 4,771,638 A * | 9/1988 | Sugiyama et al. ............. 73/721 |
| 4,975,390 A * | 12/1990 | Fujii et al. ..................... 438/53 |
| 5,503,034 A * | 4/1996 | Amano et al. ......... 73/862.473 |
| 5,587,601 A * | 12/1996 | Kurtz ......................... 257/417 |
| 6,038,928 A * | 3/2000 | Maluf et al. .................. 73/724 |
| 6,422,088 B1 * | 7/2002 | Oba et al. ..................... 73/754 |
| 6,933,582 B2 * | 8/2005 | Ishio et al. ................. 257/419 |
| 2002/0062698 A1 * | 5/2002 | Baba et al. .................... 73/754 |

FOREIGN PATENT DOCUMENTS

| JP | A-H02-69630 | 3/1990 |
| JP | A-H04-114478 | 4/1992 |

* cited by examiner

*Primary Examiner*—Max Noori
(74) *Attorney, Agent, or Firm*—Posz Law Group, PLC

(57) ABSTRACT

A pressure sensor includes a semiconductor substrate and a pedestal member such as a glass pedestal. The semiconductor substrate has a diaphragm for detecting a pressure and a thick portion positioned around the diaphragm. The pedestal member has one surface bonded to the thick portion of the semiconductor substrate and the other surface opposite to the one surface. In the pressure sensor, the pedestal member has a through hole through which pressure is introduced to the diaphragm. The through hole penetrates through the pedestal member from an opening of the other surface to the one surface of the pedestal member, and the through hole has a hole diameter that becomes smaller from the one surface toward the other surface of the pedestal member. Accordingly, it can effectively restrict foreign materials such as dusts from being introduced into the through hole of the pressure sensor.

13 Claims, 2 Drawing Sheets

PRESSURE SENSOR

CROSS REFERENCE TO RELATED APPLICATION

This application is based on Japanese Patent Application No. 2004-31687 filed on Feb. 9, 2004, the contents of which are incorporated herein by reference.

FIELD OF THE INVENTION

The present invention relates to a pressure sensor, which is formed by bonding a semiconductor substrate having a diaphragm for a pressure detection to a glass pedestal having a pressure introduction hole.

BACKGROUND OF THE INVENTION

A pressure sensor including a semiconductor substrate and a glass pedestal is described in JP-A-2-69630 or JP-A-4-114478, for example. The semiconductor substrate includes a thin diaphragm for detecting a pressure, and a thick wall portion around the diaphragm. One side surface of the glass pedestal is bonded to the thick wall portion of the semiconductor substrate. Furthermore, a through hole is provided in the glass pedestal to penetrate through from the one side surface of the glass pedestal to the other side surface thereof, so that a pressure is introduced to the diaphragm through the through hole from an opening on the other surface of the glass pedestal.

However, in this pressure sensor, if the through hole of the glass pedestal is large, foreign materials such as dust are easily introduced into the through hole due to the pressure. If the foreign materials adhere on the diaphragm, sensor characteristics of the pressure sensor will be changed.

SUMMARY OF THE INVENTION

In view of the above-described problems, it is an object of the present invention to effectively restrict foreign materials from being introduced into a pressure sensor having a through hole through which pressure is introduced to a diaphragm to detect the pressure.

It is another object of the present invention to accurately detect pressure while it can effectively restrict foreign materials from being introduced into a pressure sensor through a through hole.

According to an aspect of the present invention, a pressure sensor includes a semiconductor substrate and a pedestal member. The semiconductor substrate includes a diaphragm for detecting a pressure and a thick portion positioned around the diaphragm. The thick portion includes a wall thickness thicker than that of the diaphragm. The pedestal member has one surface bonded to the thick portion of the semiconductor substrate and the other surface opposite to the one surface.

In the pressure sensor, the pedestal member has a through hole through which pressure is introduced. The through hole penetrates through from an opening of the other surface to the one surface of the pedestal member, and the through hole has a hole diameter that becomes smaller from the one surface toward the other surface of the pedestal member. Accordingly, it can effectively restrict foreign materials from being introduced into the through hole while pressure can be sufficiently introduced to the diaphragm through the through hole.

For example, the pedestal member is a glass pedestal made of a glass material. Furthermore, the shape of the through hole can be suitably changed only when the hole diameter becomes smaller from the one surface toward the other surface of the pedestal member. For example, the through hole has a circular cone shape or a polygon shape such as a pyramid shape, where the hole diameter becomes smaller from the one surface toward the other surface of the pedestal member.

Preferably, the semiconductor substrate has a first surface opposite to the pedestal member, and a second surface at which the thick portion is bonded to the pedestal member. In this case, the second surface of the semiconductor is recessed at a center area portion to have a recess portion and to form the diaphragm inside the thick portion.

For example, the opening of the through hole is opened on the other surface of the pedestal member to be overlapped with at least a center area of the diaphragm. In this case, a pressure to be detected can be accurately introduced to the diaphragm so that the pressure can be accurately detected.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

Figure 1:
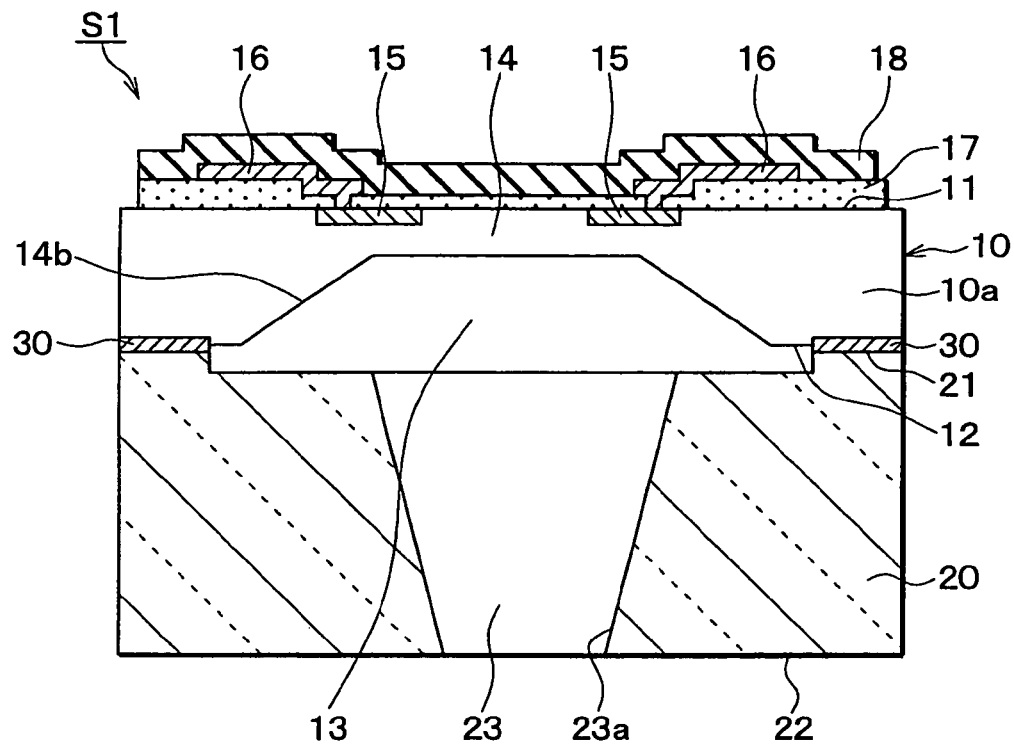
FIG. 1 is a schematic cross-sectional view showing a semiconductor pressure sensor according to a preferred embodiment of the present invention.

A preferred embodiment of the present invention will be now described with reference to FIGS. 1 and 2. In this embodiment, a semiconductor pressure sensor S1 is manufactured by using a silicon substrate 10 as a semiconductor substrate. The silicon substrate 10 has a first surface 11 (top surface in FIG. 1) and a second surface 12 opposite to the first surface 11. The silicon substrate 10 is formed into a rectangular plan shape in which a plan direction of the first or second surface 11, 12 is a surface (110) or a surface (100).

The second surface 12 of the silicon substrate 10 is recessed by anisotropic etching using an alkalis liquid, so as to form a recess portion 13. A wall thickness of the silicon substrate 10 is thinned due to the formation of the recess portion 13, and the thinned portion is used as a diaphragm 14 for detecting a pressure in the silicon substrate 10. As shown in FIG. 2, the diaphragm 14 has a square planar shape with a taper portion 14b. However, the diaphragm 14 may be formed into the other shape such as an octagon planar shape.

Piezoresistance members 15 are formed in the diaphragm 14 for outputting detection signals of resistance variations due to a bending of the diaphragm 14. The piezoresistance members 15 are formed by injecting and diffusing ions. For example, the piezoresistance members 15 are formed on the surface (110) of the silicon substrate 10. In this case, the piezoresistance members 15 are constructed with two center gauges arranged adjacent to a center area of the diaphragm 14 along a crystal axial direction of <110>, and two side gauges arranged at an outer peripheral portion of the diaphragm 14.

The piezoresistance members 15 are joined to form Wheatstone bridge by a diffusion wire layer (not shown), and are electrically connected with each other. The diffusion wire layer is also formed by injecting and diffusing ions.

When a dc constant voltage is applied between input terminals of a Wheatstone bridge circuit of this embodiment, a bending of the diaphragm 14 is displayed as a resistance variation of the piezoresistance members 15, and a voltage value corresponding to a pressure to be detected is output as detection signals from between output terminals of the Wheatstone bridge circuit.

A wiring layer 16 is formed on the first surface 11 of the silicon substrate 10 above the thick portion 10a positioned at an outer peripheral portion of the diaphragm 14. Through the wiring layer 16, the piezoresistance member 15 is electrically connected to an exterior, voltage is applied to the Wheatstone bridge circuit, and the detection signals are output from the Wheatstone bridge circuit.

An insulation layer 17 made of an insulation material such as a silicon oxide film is formed on the first surface of the silicon substrate 10. The wiring layer 16 is formed on the insulation layer 17 by a vacuum evaporation using aluminum, for example. Furthermore, the wiring layer 16 is electrically connected to the piezoresistance member 15 through a conduct hole provided in the insulation layer 17.

A protective layer 18 is formed on the wiring layer 16 and the insulation layer 17 in order to protect the semiconductor pressure sensor S1. For example, the protective layer 18 is a protection film formed from a silicon nitride film. An opening (not shown) is formed in the protective layer 18 at a position above the wiring layer 16. Through the opening, the wiring layer 16 is electrically connected to the exterior using a wire bonding. As described above, the silicon substrate 10 can be easily manufactured using a general semiconductor manufacturing technique.

The glass pedestal 20 is made of a borosilicate glass, for example. One surface 21 of the glass pedestal 20 is bonded to the second surface 12 of the silicon substrate 10 at the thick portion 10a through an anode bonding or using an adhesive 30.

A through hole 23 is formed in the glass pedestal 20 to penetrate through from the other surface 22 of the glass pedestal 20 to the one surface 21 thereof. The through hole 23 is used as a pressure introducing hole, through which a pressure is introduced from an opening 23a of the other surface 22 of the glass pedestal 20 to the diaphragm 14 of the silicon substrate 10.

The through hole 23 is shaped so that its opening diameter becomes narrower from the one surface 21 of the glass pedestal 20 to the other surface 22 thereof. Specifically, the through hole 23 is formed into a circular cone shape such that its hole diameter becomes smaller from the one surface 21 of the glass pedestal 20 toward the other surface 22. The through hole 23 may be formed into a shape other than the circular cone shape provided that the hole diameter of the through hole 23 becomes smaller from the one surface 20 of the glass pedestal 20 to the other surface 22 thereof. For example, the through hole 23 can be formed into a pyramid shape.

The through hole 23 having the circular cone shape or the pyramid shape can be easily formed in the glass pedestal by cutting. For example, the cutting is performed in the glass pedestal 20 by applying vibrations to a probe (needle) using supersonic waves.

Accordingly, the diaphragm 14 is moved (bent) based on a pressure difference between a pressure applied from the opening portion 23a of the through hole 23 to the recess portion 13, and a pressure applied from the first surface 11 of the silicon substrate 10 to the diaphragm 14. Furthermore, the resistance value of the piezoresistance 15 is changed based on the stress generated in the diaphragm 14. Due to the variations in the resistance value, the detection signals are output from the Wheatstone bridge circuit. The detection signals are processed after being sent to an outer circuit from the wiring layer 16 so as to become output signals. Accordingly, a pressure can be detected by using the semiconductor pressure sensor S1.

In this embodiment, the pressure sensor S1 includes the silicon substrate 10 and the glass pedestal 20. The silicon substrate 10 includes the diaphragm 14 used as a thin portion for pressure-detecting, and the thick portion 10a positioned around the diaphragm 14. The one surface 21 of the glass pedestal 20 is bonded to the thick portion 10a of the silicon substrate 10. Furthermore, the through hole 23 is formed to penetrate through the glass pedestal 20 from the other surface 22 of the glass pedestal 20 to the one surface 21 thereof so that a pressure can be introduced through the through hole 23 from the opening 23a of the other surface 22 to the diaphragm 14 of the silicon substrate 10. In this pressure sensor S1, the through hole 23 is formed in the glass pedestal 20 such that the hole diameter of the through hole 23 becomes narrower from the one surface 21 of the glass pedestal 20 to the other surface 22 thereof.

According to the pressure sensor S1 of this embodiment, the hole diameter of the through hole 23 becomes narrower from the one surface 21 of the glass pedestal 20, which is adjacent to the diaphragm 14, toward the other surface 22 of the glass pedestal 20, from which pressure is introduced. That is, the opening 23a is opened on the other surface 22 of the glass pedestal 20 to be overlapped with a center area of the diaphragm 14, and the hole diameter of the through hole 23 is enlarged toward the second surface 21 on the side of the diaphragm 14. Therefore, it is difficult to introduce foreign materials such as dust into through hole 23 compared with a case through hole 23 has a constant hole diameter for the diaphragm 14. Therefore, it can effectively restrict the foreign material from being introduced to the interior of the pressure sensor S1 from the through hole 23 while the pressure can be easily introduced to the diaphragm 14 through the through hole 23.

Although the present invention has been fully described in connection with the preferred embodiment thereof with reference to the accompanying drawings, it is to be noted that various changes and modifications will become apparent to those skilled in the art.

Figure 2:
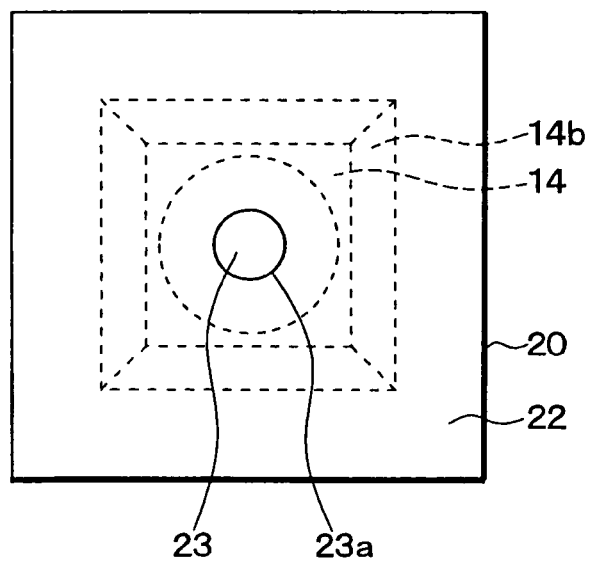
FIG. 2 is a plan view of the semiconductor pressure sensor when being viewed from a surface side of the glass pedestal opposite to a diaphragm, according to the preferred embodiment.
Figure 3:
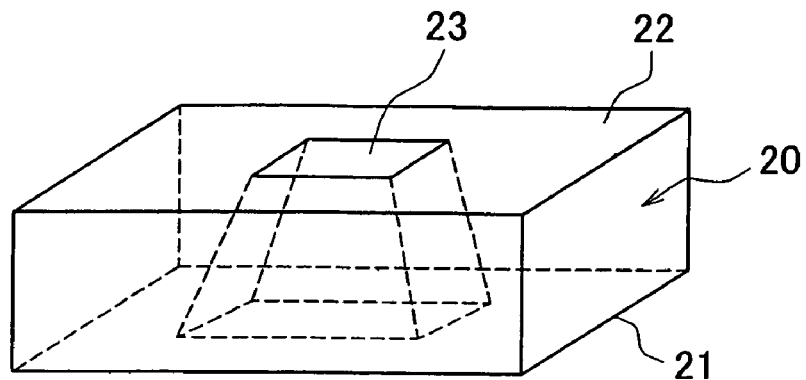
FIG. 3 is a perspective view of the pedestal member according to a first embodiment.
Figure 4:
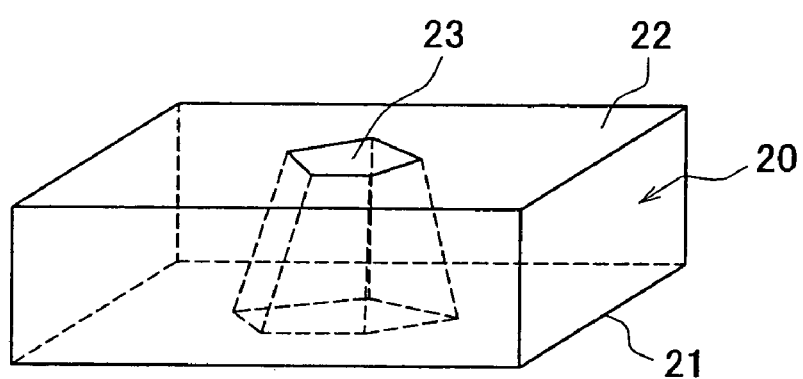
FIG. 4 is a perspective view of the pedestal member according to a second embodiment.
Figure 5:
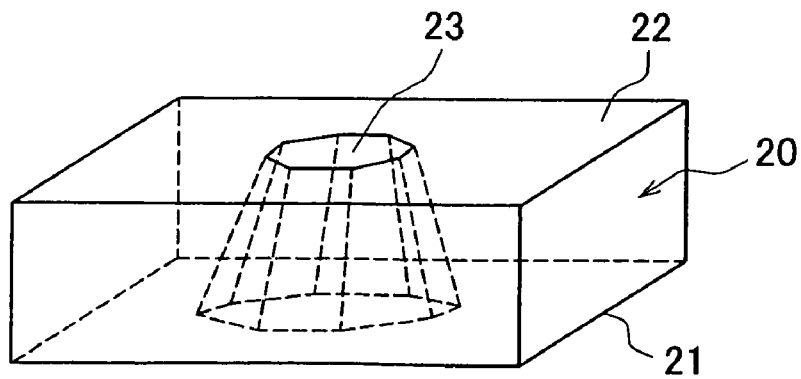
FIG. 5 is a perspective view of the pedestal member according to a third embodiment.

For example, the shape of the through hole 23 is not limited to the circular cone shape shown in FIGS. 1 and 2 or the pyramid shape illustrated in FIG. 3. Provided that the hole diameter of the through hole 23 is reduced from the one surface 21 of the glass pedestal 20 to the other surface 22 of the glass pedestal 20, the shape of the through hole 23 may be arbitrarily changed. For example, the shape of the through hole 23 may be formed into a polygon shape except for the pyramid shape, such as illustrated in FIG. 4 and FIG. 5.

The other parts of the pressure sensor S1 except for the through hole 23 may be arbitrarily changed based on a general structure of a pressure sensor. For example, the pedestal 20 is not limited to a glass pedestal, and may be made of the other material to form a pedestal member.

Such changes and modifications are to be understood as being within the scope of the present invention as defined by the appended claims.

What is claimed is:

1. A pressure sensor comprising:
   a semiconductor substrate having a diaphragm for detecting a pressure and a thick portion positioned around the diaphragm, the thick portion having a wall thickness thicker than that of the diaphragm; and
   a pedestal member having one surface bonded to the thick portion of the semiconductor substrate and the other surface opposite to the one surface, wherein:
   the pedestal member has a through hole through which pressure is introduced to the diaphragm, the through hole penetrating through from an opening of the other surface to the one surface of the pedestal member;
   the through hole has a hole diameter that becomes smaller from the one surface toward the other surface of the pedestal member;
   the pedestal member is a glass pedestal made of a glass material, the through hole being provided in the glass pedestal; and
   the hole diameter of the through hole on the one surface of the pedestal member is larger than the hole diameter of the through hole on the other surface of the pedestal member.

2. The pressure sensor according to claim 1, wherein the through hole gradually and continuously becomes smaller from the one surface to the other surface of the pedestal member.

3. The pressure sensor according to claim 1, wherein the through hole has a circular cone shape where the hole diameter becomes smaller from the one surface toward the other surface of the pedestal member.

4. The pressure sensor according to claim 1, wherein the through hole has a pyramid shape where the hole diameter becomes smaller from the one surface toward the other surface of the pedestal member.

5. The pressure sensor according to claim 1, wherein the through hole has a polygon shape where the hole diameter becomes smaller from the one surface toward the other surface of the pedestal member.

6. The pressure sensor according to claim 1, wherein:
   the semiconductor substrate has a first surface opposite to the pedestal member, and a second surface at which the thick portion is bonded to the pedestal member; and
   the second surface of the semiconductor is recessed at a center area portion to have a recess portion and to form the diaphragm inside the thick portion.

7. The pressure sensor according to claim 6, wherein the opening of the through hole is opened on the other surface of the pedestal member to be overlapped with at least a center area of the diaphragm.

8. The pressure sensor according to claim 6, wherein:
   the thick portion is provided continuously from the diaphragm; and
   the through hole is provided such that pressure is introduced to the diaphragm through the through hole and the recess portion.

9. The pressure sensor according to claim 6, further comprising:
   a resistance member which generates an electrical resistance based on a stress of the diaphragm, the resistance member being arranged in the semiconductor substrate adjacent to the first surface; and
   a wiring member through which the resistance member is electrically connected to an exterior, wherein the wiring member is provided above the first surface at least at the thick portion.

10. The pressure sensor according to claim 1, wherein the through hole extends in the pedestal member in a direction perpendicular to the one surface and the other surface of the pedestal member.

11. The pressure sensor according to claim 1, wherein the pedestal member is entirely positioned opposite to the diaphragm, relative to the semiconductor substrate.

12. The pressure sensor according to claim 1, further comprising an insulation layer formed on a surface of the semiconductor substrate opposite to the pedestal member.

13. The pressure sensor according to claim 12, further comprising a protective layer formed on a surface of the insulation layer opposite to the semiconductor substrate.

* * * * *